(No Model.)
C. A. EISENHART.
INSULATOR PIN AND BRACKET MACHINE.
No. 505,309. Patented Sept. 19, 1893.
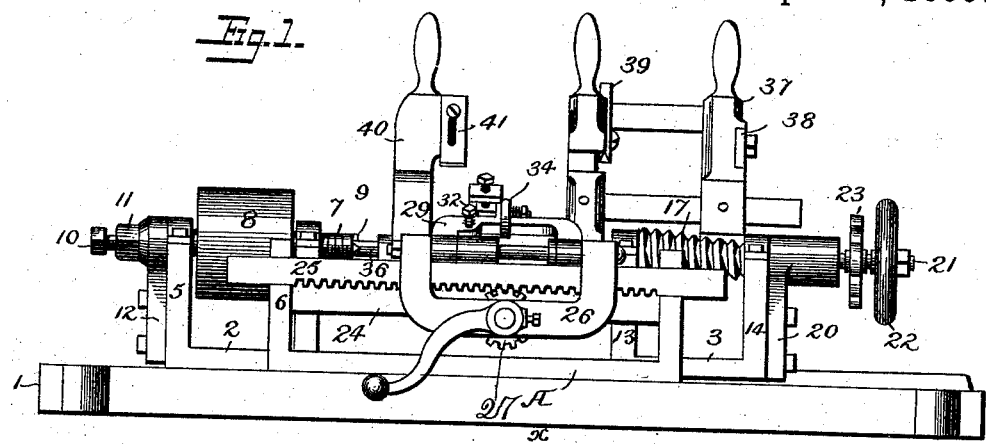
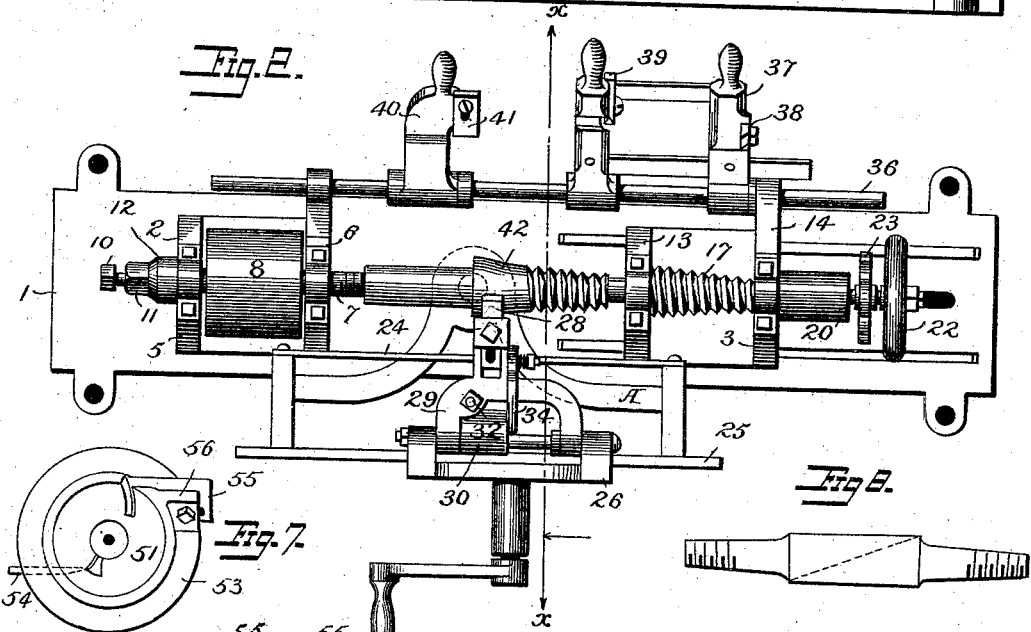
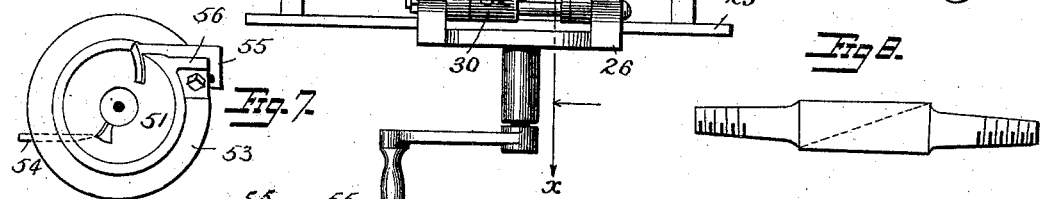
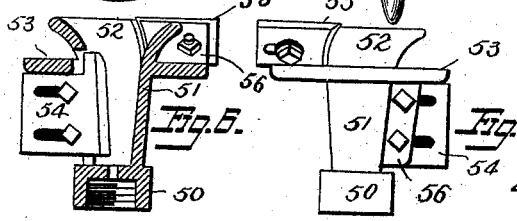
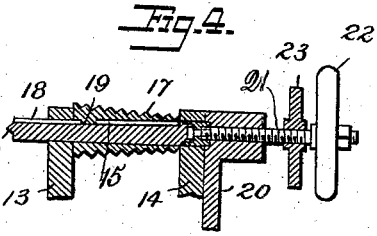
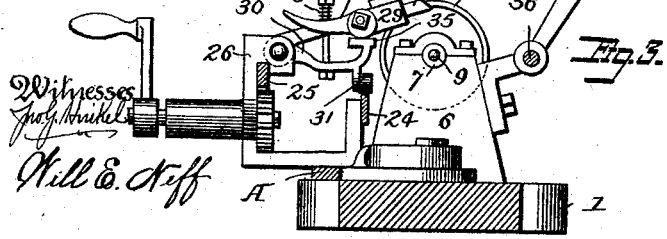
Witnesses
Inventor
C. A. Eisenhart
By J. A. Watson
Attorney

UNITED STATES PATENT OFFICE.

CHARLES A. EISENHART, OF YORK, PENNSYLVANIA.

INSULATOR PIN AND BRACKET MACHINE.

SPECIFICATION forming part of Letters Patent No. 505,309, dated September 19, 1893.

Application filed October 4, 1892. Serial No. 447,800. (No model.)

*To all whom it may concern:*

Be it known that I, CHARLES A. EISENHART, a citizen of the United States, residing at York, in the county of York and State of Pennsylvania, have invented certain new and useful Improvements in Insulator Pin and Bracket Machines, of which the following is a specification.

My invention relates to machines for turning and screw-threading wooden insulator pins and brackets such as are used upon telegraph poles for supporting electric wires; and it consists in various improvements in the construction and arrangement of such machines.

In the accompanying drawings in which like reference signs refer to similar parts throughout the several views, Figure 1 is a side elevation of my improved machine. Fig. 2 is a plan of the same. Fig. 3 is a sectional view on the line x—x of Fig. 2. Fig. 4 is a view partly in section of a portion of the tail stock. Figs. 5, 6 and 7 are respectively side, sectional and plan views of a cutter head for shaping the bracket pins, and Fig. 8 is a view of a pair of brackets before being sawed apart.

The principal parts of the machine are a bed plate 1, a head stock 2, a tail stock 3, adjustable upon the bed as in ordinary lathes and a tool support 4. The head stock 2 is bolted to the bed plate and is formed with two bearings 5, 6 in which runs a shaft or spindle 7 carrying a pulley 8 and a spur center 9. A set screw 10 having a locking nut 11 passes through a bracket 12 upon the end of the head stock and forms an adjustable end bearing for the shaft 7 to take up the thrust upon the shaft when a pin is forced onto the center. The tail stock is adjustable lengthwise of the bed upon V-shaped ways and it may be bolted to the bed in any desired position. Like the head stock it consists of two upright bearings 13, 14, in which is mounted a shaft or spindle 15 having a spur center 16. Upon the shaft 15 between the arms 13 and 14 of the tail stock is a conical guide screw 17 tapered and threaded to correspond with the tapered and threaded portion of the insulator pin. This guide screw is prevented from moving lengthwise by the uprights 13, 14, and it is arranged to turn with the shaft 15 by means of a groove 18 in the shaft and a stud 19 upon the screw. At the rear of the tail stock is a bracket 20 having a threaded hole in line with the shaft 15 in which turns a screw 21 which is connected to the shaft 15 by a swiveled joint. The screw 21 carries a hand wheel 22 for adjusting the tail center and a locking nut 23 for holding the center in place.

The tool support 4 carries a templet 24 and a rack bar 25. Upon the upper edge of the rack bar slides a tool carriage 26, said carriage being movable upon the bar by means of a pinion 27. The tool 28 is held in a hinged frame 29. Another hinged frame 30 rests upon the templet 24 either directly or through the medium of an anti-friction roller 31. The two frames 29 and 30 are connected and constantly drawn toward each other by a bolt 32 and a spiral spring 33. A cam 34 pivoted on the frame 29 rests upon a bearing 35 of the frame 30 and by adjusting the cam the tool 28 is lowered or raised so as to cut more or less into the wood.

At the back of the machine is a rod 36 mounted in suitable brackets upon the stocks. A frame 37 which is hinged upon the rod 36 and free to move lengthwise thereof carries a guide piece 38 adapted to run in the groove of the screw guide 17 and a tool 39 for cutting the thread upon the pin. Another tool holder 40 upon the rod 36 carries a tool 41 for cutting the shoulder upon the pin.

The operation of my machine is as follows: The block 42 from which the pin is to be turned is clamped in the centers by means of the head wheel 22 and hand nut 23. Power is applied to the pulley 8 and the screw 17 is rotated through the medium of the block 42 and shaft 15. By means of the cam 34 the tool 28 is adjusted to take the first cut and the pinion 27 is then rotated to carry the tool from end to end of the work, the templet guiding the tool properly. The cam 34 is then turned and the tool lowered, one or more additional cuts being taken if necessary. The cam is of such shape that when the tool is lowered to the lowest point the pin will be reduced to the proper size. The tool 41 is then brought down for a moment to cut the square shoulder upon a pin. Lastly the frame 37 is lowered and the guide 38 inserted in the thread at the smaller end of the screw 17. This operates in an obvious manner to quickly cut the proper thread upon the pin, after which the tail stock is withdrawn and a new block inserted to be operated on. My machine may also be used in the manufacture of insulator brackets such as are shown in Fig. 8. In said figure two brackets are shown in a single block it being only necessary to sever them along the diagonal dotted line to complete them. In Figs. 5, 6 and 7 is shown a cutter head for shaping the ends of the block as shown in Fig. 8. Said cutter head has a screw threaded socket 50 which may be fitted upon the spindle 7 of the machine. It consists further of a hollow body 5, having a flaring mouth 52, a strengthening flange 53 and adjustable cutters 54 and 55 slotted and bolted to wings 56. In the manufacture of brackets the block is first turned down at each end by the cutter head, the threads are then cut on each end successively by the cutter 39, as above described, and lastly the block is severed along a diagonal line thus forming two complete brackets.

What I claim, and desire to secure by Letters Patent, is—

1. The combination, in an insulator pin machine, with the bed plate and the head and tail stocks, of the spindle, arranged to turn, and movable lengthwise, in the tail stock, the screw guide splined upon the spindle, means for preventing said guide from moving lengthwise, and mechanism controlled by the screw guide for cutting the thread upon the pin substantially as described.

2. The combination in an insulator pin machine, with the bed plate and the head and tail stocks, each having spindles and spur centers, of bearings in which the tail stock spindle revolves, a guide screw splined upon said spindle and arranged between said bearings, an adjusting screw connected to the end of the spindle by a swivel joint a hand wheel for the adjusting screw, and mechanism controlled by the screw guide for cutting the thread upon the pin substantially as described.

3. The combination in an insulator pin machine, with the bed plate and the head and tail stocks, of spindles having spur centers mounted in said stocks, a driving pulley upon the spindle of the head stock, a guide screw splined upon the spindle of the tail stock, means for adjusting said latter spindle longitudinally, mechanism controlled by the screw guide for cutting the thread upon the pin a tool support having a rack and templet and a tool carriage movable lengthwise upon said support by means of a pinion and crank, substantially as described.

4. The combination in an insulator pin machine, with the head and tail stocks provided with spindles having spur centers, of a guide screw 17 mounted on the spindle of the tail stock, a rod 36 in the rear of the machine and a frame 37 hinged upon the rod and provided with a guide piece 38 adapted to run in the groove of the screw guide and a thread cutting tool 39, substantially as described.

In testimony whereof I affix my signature in presence of two witnesses.

CHARLES A. EISENHART.

Witnesses:
J. F. W. SLEEDER,
JACOB L. WIEST.